R. B. GILCHRIST.
MIXER.
APPLICATION FILED JULY 30, 1915.

1,201,284.

Patented Oct. 17, 1916.

Witness:
John Enders

Inventor:
Raymond B. Gilchrist
by Fred Gulach
his Atty.

UNITED STATES PATENT OFFICE.

RAYMOND B. GILCHRIST, OF NEWARK, NEW JERSEY, ASSIGNOR TO THE GILCHRIST COMPANY, OF NEWARK, NEW JERSEY, A CORPORATION OF NEW JERSEY.

MIXER.

1,201,284. Specification of Letters Patent. Patented Oct. 17, 1916.

Application filed July 30, 1915. Serial No. 42,766.

*To all whom it may concern:*

Be it known that I, RAYMOND B. GILCHRIST, a resident of Newark, in the county of Essex and State of New Jersey, have invented certain new and useful Improvements in Mixers, of which the following is a full, clear, and exact description.

The invention relates to mixers and more particularly to that type which includes a removable strainer cover and a breaking device for fluids, such as an egg drink, which requires a cutting or breaking action in addition to the agitation to effect thorough commingling and disintegration of the constituents of the mixture.

One object of the invention is to provide a mixer with an improved egg-breaking device which is simple in construction and which can be readily cleansed so that it will be sanitary and which efficiently serves to disintegrate and mix the contents of the receptacle. Heretofore, it has been the practice in devices of this character to employ spurs for this purpose, but these devices were unsanitary, because of the difficulty in thoroughly cleansing them.

A further object of the invention is to provide an improved breaking device which consists of a conoidal spiral strip at the top of the receptacle and is extended over substantially the entire area of the top of the receptacle to provide cutting edges of great length, so that liquid thrown against the mixer top will strike some or other portion of the cutting spiral. A resultant advantage is that this form of breaking device is somewhat resilient, so that when ice, with which the drink is usually mixed, strikes against it, a cushioning effect will be obtained which prevents the spiral from becoming broken and also prevents the ice, in event of severe shaking, from tending to force the cover off the body of the mixer.

The invention also contemplates forming this spiral of substantially square wire which will have four cutting edges of great length and in which the angular sides are inclined relatively to the axis of the receptacle for efficiency in disintegrating action upon the liquid.

A further object of the invention is to provide a mixer of improved construction.

Figure 1:
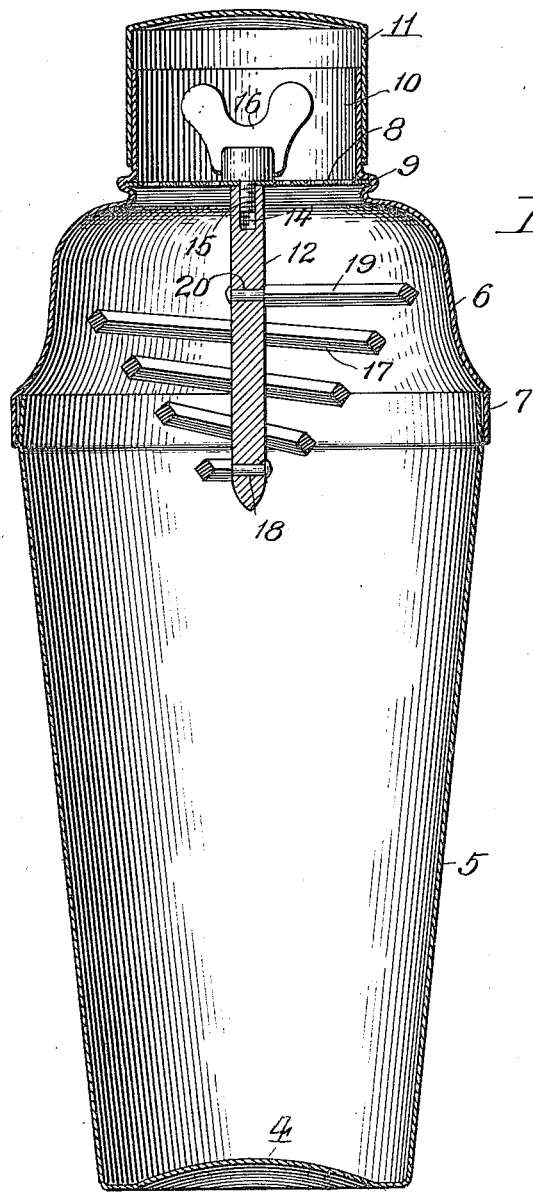
Figure 2:
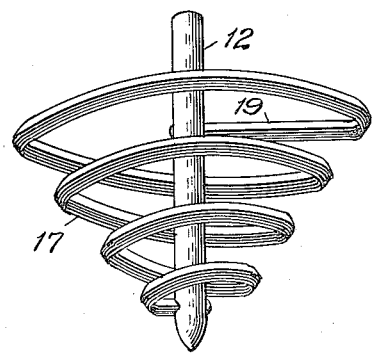

In the drawings: Figure 1 is a vertical section of a mixer embodying the invention. Fig. 2 is a perspective of the breaking device separated from the cover of the receptacle.

The mixer comprises a receptacle-body having an open top, a bottom 4, and a side wall 5. A cover 6 having a flange 7 is adapted to fit snugly around the upper end of the side wall 5 to removably hold the cover on the body. A perforated strainer-plate 8 is fixedly secured in the cover by spinning the latter around the edge of the plate, as at 9. The cover is extended above the strainer-plate, as at 10, to form a spout through which the strained contents of the mixer can be poured and a cup-shaped cap 11 is adapted to fit on the top and form a closure therefor during the shaking of the receptacle.

The improved breaker is carried by a central post 12 which is provided with a screw-threaded socket 14 at its upper end adapted to receive a screw 15 which is adapted to extend through one of the holes in the strainer-plate and is on a thumb-nut 16. The upper end of the post 12 abuts against the lower face of said plate so that the post will be rigidly but removably secured to the strainer-plate. The breaker consists of a strip of wire 17 which is substantially square in cross section and is formed into an inverted substantially conoidal spiral. The lower end of this wire is turned toward the post and reduced and extended through the lower end of post 12, as at 18, and riveted thereto so that it will be rigid with the post. The upper end of the spiral wire is extended from the coil of greatest diameter directly toward the post, as at 19, and is formed with a reduced portion 20, which extends through the post 12 and is riveted thereto. The coil is formed so that there will be cutting edges at the bottom and the top and both sides of the windings of the coil, and this gives great efficiency in breaking action.

In practice, it has been found that a breaking device thus formed is efficient to disintegrate the contents of the mixer, because the wire has a number of sharp cutting edges of great length. This device is sanitary, because the use of spurs, which are difficult to cleanse, will be avoided, and because substantially all surfaces are accessible for cleansing. In practice, it sometimes occurs that the liquid adheres to the breaking device. The coils of the spiral are separated sufficiently so that all portions of the wire can be thoroughly cleansed and wiped, if desired. By employing a radial arm or connecting portion 19 between the coil of greatest diameter and the post, the inner surfaces of the windings are left accessible when the post is removed from plate 8. Furthermore, when square wire is employed, the spiral has sufficient resiliency to prevent the ice from bending it and from tending to displace the cover from the body of the receptacle. By employing an inverted conoidal spiral, the ice is prevented from packing against the strainer-plate when pouring out the liquid through spout 10, and therefore, the spiral serves as a guard for the strainer as well as a breaker. The surfaces of the wire, being inclined relatively to the axis of the receptacle, tend to deflect the ice away from the strainer.

When the breaking device is removed, which can be readily done by removing the nut 16, the strainer top is entirely free from projections and the mixer can be used without the breaking device, if desired.

The invention is not to be understood as restricted to the details set forth, since these may be modified within the scope of the appended claims, without departing from the spirit and scope of the invention.

Having thus described my invention, what I claim as new and desire to secure by Letters Patent, is:

1. In a mixer, the combination with a receptacle and a removable cover thereon, of a post, means for attaching the post to the cover so it is removable from the receptacle therewith, and a breaker consisting of an inverted conoidal spiral of wire extended around the post.

2. In a mixer, the combination with a receptacle and a removable cover having a strainer fixed therein, of a post, means for attaching the post to and so it will depend from the strainer, and a breaker consisting of a spiral of wire extended around and rigidly secured to the post.

3. In a mixer, the combination with a receptacle, and a removable cover having a strainer fixed therein, of a post, means for removably securing the post to and so it will depend from the strainer, and a breaker consisting of a spiral of wire having both of its ends secured to the post.

4. In a mixer, the combination with a receptacle and a removable cover fitting thereon, of a post, means for attaching the post to the cover, and a breaker consisting of a spiral polygonal wire on the post.

5. In a mixer, the combination with a receptacle, and a removable cover thereon, of a breaker consisting of a spiral of wire substantially square in cross section, and means for attaching the breaker to the cover.

6. In a mixer, the combination with a receptacle and a removable cover thereon having a strainer-plate fixed therein, of a breaker consisting of an inverted conoidal spiral of wire substantially square in cross-section, and means for attaching the breaker to the strainer-plate.

7. In a mixer, the combination with a receptacle, and a removable cover thereon, of a breaker consisting of a spiral of wire substantially square in cross section, the surfaces of the wire being inclined relatively to the axis of the receptacle, and means for attaching the breaker to the cover.

8. In a mixer, the combination with a receptacle, and a removable cover thereon, of a post attached to and removable with the cover, and a breaker on the post and consisting of an inverted conoidal spiral of wire, substantially square in cross section, the surfaces of the wire being inclined relatively to the axis of the post.

9. In a mixer, the combination with a receptacle and a removable cover thereon, of a post, removably attached to the cover, and a breaker consisting of an inverted conoidal spiral of wire having both of its ends extended through and rigidly secured to the post.

10. In a mixer, the combination with a receptacle and a removable cover having a strainer-plate thereon, of a post, means for detachably securing the post to the strainer-plate, and a breaker consisting of an inverted conoidal spiral of wire having both of its ends extended through and rigidly secured to the post.

11. In a mixer, the combination with a receptacle, comprising a body and a removable cover thereon, of a post, means for securing the post to the cover so it is removable from the body therewith, and a breaker consisting of a conoidal spiral of wire having both of its ends reduced and extended through and riveted to the post.

12. In a mixer, the combination with a receptacle and a removable cover fitting thereon, the cover having a perforated strainer plate fixed therein, and a removable cap on the top thereof, of a post, means for detachably securing the post to the strainer-plate and a breaker, consisting of an inverted conoidal spiral of wire having its lower end secured to the lower end of the post and having a radial portion extending from the upper coil inwardly to the post, both ends of the spiral being fixed in the post.

RAYMOND B. GILCHRIST.

Witnesses:
A. MULLIGAN,
THOMAS JAMESON.